(12) United States Patent
Josephson et al.

(10) Patent No.: US 6,484,275 B1
(45) Date of Patent: Nov. 19, 2002

(54) SYSTEM AND METHOD FOR INTERFACING DATA WITH A TEST ACCESS PORT OF A PROCESSOR

(75) Inventors: Don D Josephson, Ft Collins, CO (US); Daniel J Dixon, Thornton, CO (US); James S Finnell, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/449,793

(22) Filed: Nov. 26, 1999

(51) Int. Cl.[7] .................................................. H02H 3/05
(52) U.S. Cl. ...................... 714/39; 714/30; 714/726; 714/727
(58) Field of Search ........................... 714/30, 40, 726, 714/727, 25; 717/128

(56) References Cited

U.S. PATENT DOCUMENTS

| 5,361,374 A | * | 11/1994 | Sasaki et al. .................. 700/40 |
| 5,530,706 A | | 6/1996 | Josephson et al. .......... 371/22.3 |
| 5,570,375 A | * | 10/1996 | Tsai et al. ...................... 714/30 |
| 5,627,842 A | * | 5/1997 | Brown et al. ................ 714/720 |
| 5,828,827 A | * | 10/1998 | Mateja et al. .................. 714/30 |
| 5,872,793 A | * | 2/1999 | Attaway et al. ............. 714/726 |
| 5,961,653 A | * | 10/1999 | Kalter et al. ................... 714/30 |
| 6,055,656 A | * | 4/2000 | Wilson et al. ............... 714/724 |
| 6,178,525 B1 | * | 1/2001 | Warren .......................... 714/30 |
| 6,327,683 B1 | * | 12/2001 | MacCormack .............. 714/726 |
| 6,408,412 B1 | * | 6/2002 | Rajsuman .................... 714/724 |
| 6,408,414 B1 | * | 6/2002 | Hatada ......................... 714/727 |

OTHER PUBLICATIONS

"IEEE Standard Test Access Port and Boundary–Scan Architecture," IEEE Std 1149.1–1990 (includes IEEE std 1149.1a–1993), The Institute of Electrical and Electronics Engineers, Inc, 1993.

"Supplement to IEEE Std 1149.1–1990, IEEE Standard Test Access Port and Boundary–Scan Architecture", IEEE Std. 1149.1b–1994, The Institute of Electrical and Electronics Engineers, Inc., 1995.

* cited by examiner

*Primary Examiner*—Robert Beausoleil
*Assistant Examiner*—Marc Duncan

(57) ABSTRACT

A processor in accordance with the present invention includes memory that stores test data and control data. The processor also includes a test application that transmits the test data and the control data from the processor's memory to a test access port of the processor. The test access port then utilizes the test data and the control data to capture state data that defines at least one state of the processor while the processor is executing. This test data may be analyzed via conventional techniques to detect and isolate errors in the execution of the processor.

13 Claims, 3 Drawing Sheets

SYSTEM AND METHOD FOR INTERFACING DATA WITH A TEST ACCESS PORT OF A PROCESSOR

BACKGROUND OF THE INVENTION

1. Field of the Invention

The present invention generally relates to processor testing and, in particular, to a system and method for interfacing data with a test access port of a processor that captures state data of the processor to test the processor for errors in execution.

2. Related Art

Computer processors can be tested in a variety of ways to ensure that the processors are operating properly. For example, to test a processor, the data output by the processor can be analyzed for errors. If an error is detected, then a user is aware that the processor contains either a manufacturing or a design defect.

Monitoring the output data of the processor can provide useful information as to whether a problem exists but often fails to isolate or identify the source of the problem. In this regard, an error during execution may occur several hundred or thousand clock cycles before the processor outputs incorrect data. By the time the output data indicates that an error has occurred, the state of the processor has changed, and it may be difficult to determine what the state of the processor was when the error in execution occurred. Accordingly, it is often difficult to determine the cause of an error by externally analyzing the data output by the processor.

To facilitate debugging of processors, testing devices have been developed that capture the internal state of processors during execution so that errors can be better identified. In this regard, an error in execution generally affects the state of the processor when the error occurs. Therefore, by analyzing the state of the processor, an error in execution can be detected long before the error produces unreliable results in output data, and the state of the processor at the occurrence of the error in execution can be determined. Accordingly, it is easier to isolate or identify the cause of the error. In other words, it is easier to debug the processor.

However, most testing devices for capturing the state of processors are expensive and, for proper operation, require an operator knowledgeable with the operation of the testing device and the processor being tested. Furthermore, many of the processors that need to be tested have already been implemented in a system that is oftentimes remotely located. Therefore, the operator must often inconveniently travel to the site of the system so that the processor associated with the system can be tested.

Thus, a heretofore unaddressed need exists in the industry for providing a low cost system and method of efficiently and conveniently interfacing data with a test access port of a processor for testing purposes.

SUMMARY OF THE INVENTION

The present invention overcomes the inadequacies and deficiencies of the prior art as discussed hereinbefore. Generally, the present invention provides a system and method for enabling a processor to interface data with the processor's test access port.

A processor in accordance with the present invention includes memory that has test data and control data stored therein. The processor also includes a test application that transmits the test data and the control data from the processor's memory to a test access port of the processor. The test access port then utilizes the test data and the control data to capture state data that defines at least one state of the processor while the processor is executing. This state data may be analyzed via conventional techniques to detect and isolate errors in the execution of the processor.

In accordance with another feature of the present invention, the test access port is interfaced with a multiplexer. The multiplexer is also interfaced with the memory and an input interface capable of receiving external signals. Based on a control signal, the multiplexer selects signals defined by the test and control data transmitted from the memory or selects external signals transmitted from the input interface. The multiplexer then transmits the selected signals to the test access port, which captures state data based on the selected signals. As a result, the data used by the test access port to capture state data from the processor may be received from the memory or from an external device.

In accordance with another feature of the present invention, the test data and the control data are transmitted from the memory in parallel. Before the test access port receives this data, a first register converts the test data into serial form, and a second register converts the control data into serial form.

In accordance with another feature of the present invention, a clock within the processor is used to generate a clock signal that controls the timing of the signals transmitted to the test access port. The frequency of the control signal may be modified to synchronize the clock signal with the test access port.

The present invention can also be viewed as providing a method for testing processors. The method can be broadly conceptualized by the following steps: providing a processor having memory, a test access port, and a multiplexer, the test access port interfaced with the multiplexer; storing test data and control data into the memory, the control data corresponding with the test data; transmitting the test data and the control data from the memory to the multiplexer; selecting the test data and the control data at the multiplexer; transmitting the test data and the control data from the multiplexer to the test access port; receiving the test data and the control data at the test access port; utilizing the test data and the control data received by the test access port to capture state data defining at least one state of the processor; and analyzing the state data to identify errors associated with the processor.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
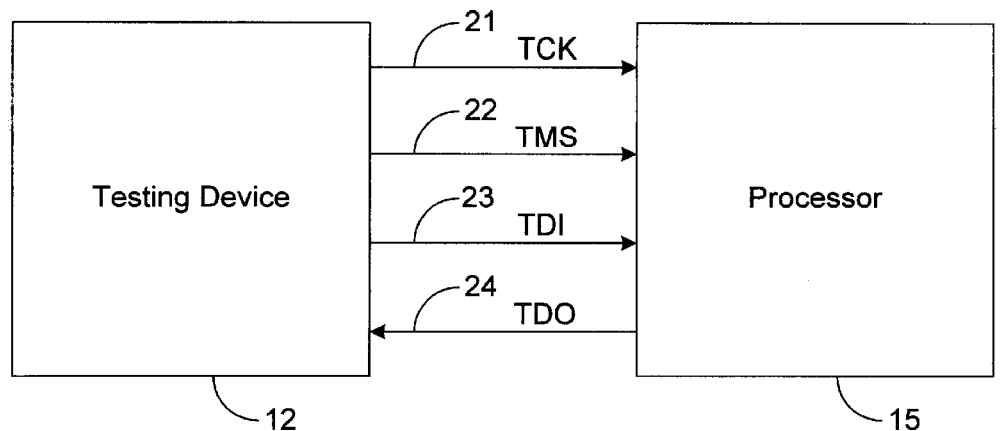
FIG. 1 is a block diagram illustrating a testing device interfaced with a conventional processor.

FIG. 1 shows a conventional testing device 12 interfaced with a processor 15, sometimes referred to as a central processing unit (CPU). As used herein, the terms "processor," "CPU," and "processing unit" shall refer to a device within a computer that interprets and executes instructions of a computer program and, in a broad sense, may include memory residing in the computer and the computer's console (as opposed to peripheral devices that are detachable from the computer).

Figure 2:
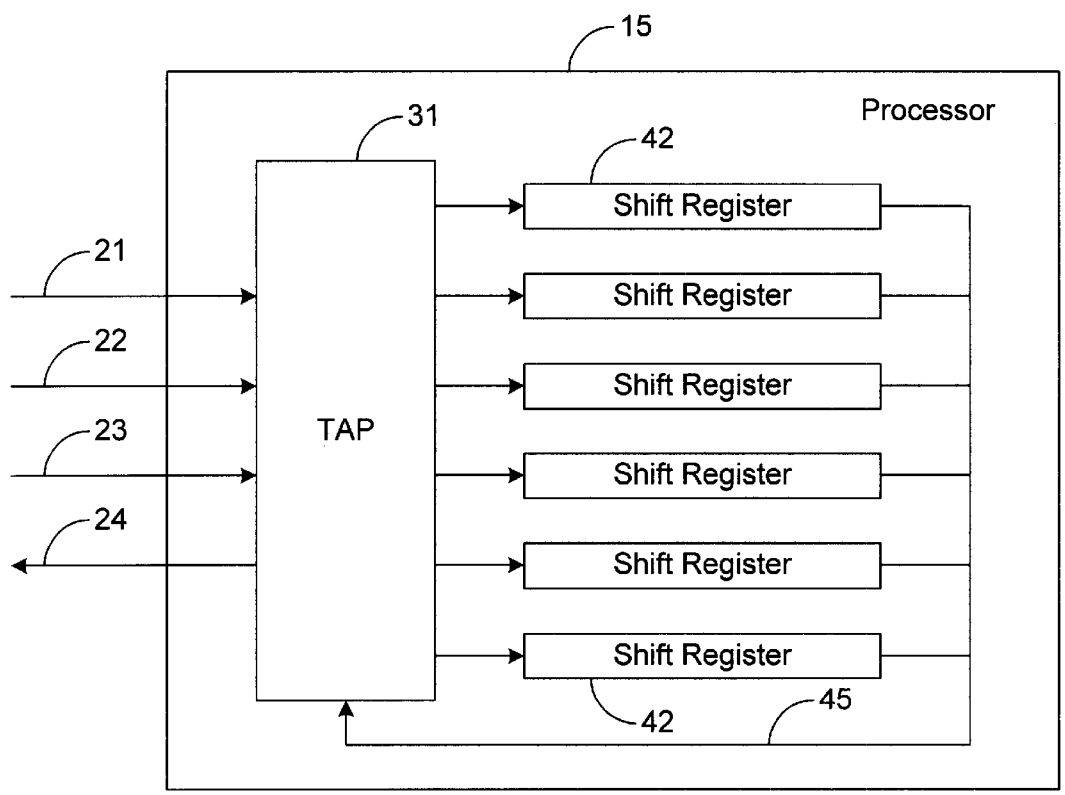
FIG. 2 is a block diagram illustrating a more detailed view of the processor depicted in FIG. 1.

As can be seen by referring to FIG. 1, the testing device 12, which is a peripheral device detachable from processor 15, is coupled to processor 15 via four connections 21–24. Connection 23 is used to serially transmit a test data input (TDI) signal directly to a test access port (TAP) 31 of the processor 15, as shown by FIG. 2. The TDI signal includes data that is to be input to various shift registers 42 in the processor 15 for the purpose of testing the processor 15 according to I.E.E.E. Standard 1149.1. The TDI signal also includes instructions that are to be executed by the TAP 31 in testing the processor 15. Connection 21 is used to serially transmit a test clock signal (TCK) to the TAP 31 so that the TDI signal transmitted on connection 21 can be properly timed and received by the TAP 31 through conventional techniques of serial data transfer.

Connection 22 is used to serially transmit a test mode select (TMS) signal from the testing device 12 to the TAP 31. The TMS signal corresponds to the TDI signal and indicates whether the data of the TDI signal being received by the TAP 31 currently defines an instruction to be executed by the TAP 31 or defines data to be input into a shift register 42. Therefore, the TMS signal controls how the TAP 31 processes the TDI signal.

Connection 24 is used to serially transmit a test data output (TDO) signal from the processor 15 to the testing device 12. The TDO signal includes state data that indicates the state of the processor 15 as data from the TDI signal is being shifted into the shift registers 42 of the processor 15. The state data from the TDO signal is analyzed by the testing device 12 to determine whether any errors have occurred during the shifting of the data from the TDI signal.

In this regard, the state data received by testing device 12 from connection 24 should match a predetermined set of state data. The testing device 12 compares the state data received from connection 24 to the predetermined set of state data and detects an error when differences exist between the predetermined set of state data and the state data received from connection 24. Furthermore, the testing device 12 can determine at exactly what point the error occurred based on the state of the processor 15 (as determined via the state data received from connection 24) when the error occurred.

The process of communicating the TDI, TCK, TMS, and TDO signals between the testing device 12 and the TAP 31 and of testing the processor 15 via the data from the aforementioned signals is fully described in 1149.1-1990 I.E.E.E. Standard Test Access Port and Boundary-Scan Architecture (includes I.E.E.E. std 1149.1a-1993) and Supplement to I.E.E.E. Std 1149.1-1990 (i.e., I.E.E.E. std 1149.1b-1994), which are incorporated herein by reference.

However, as described hereinabove in the Background section, testing device 12 is generally expensive and usually requires a trained technician familiar with the operation of the device 12 and the processor 15 to correctly interface the device 12 with the processor 15. This can be a significant burden, especially when the processor 15 has already been implemented in a system located at a remote site.

Figure 3:
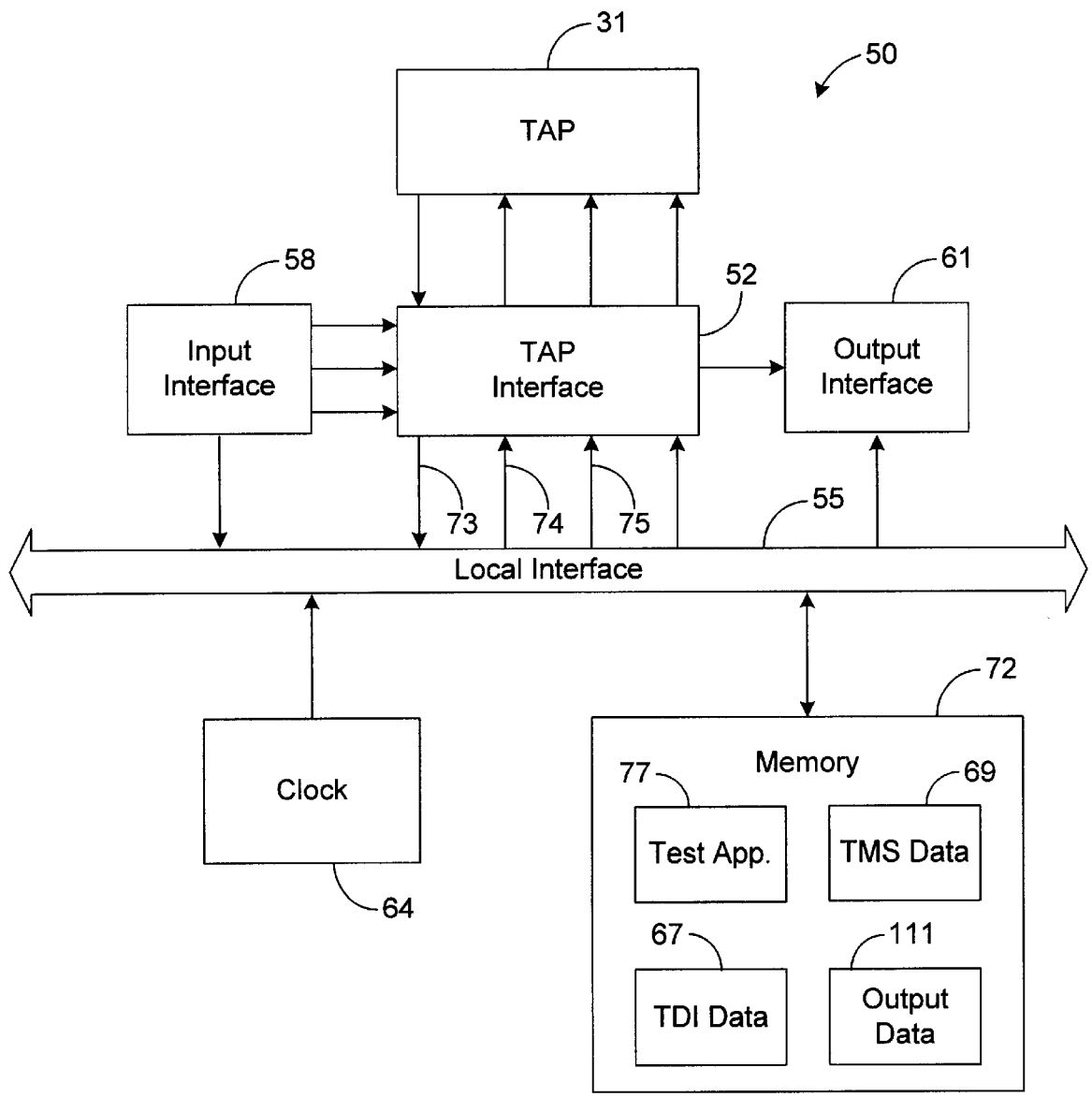
FIG. 3 is a block diagram illustrating a processor in accordance with the present invention.

The present invention generally provides a processor capable of interfacing test data with its own TAP 31 according to I.E.E.E. Standard 1149.1, thereby eliminating the need of a separate testing device 12. FIG. 3 depicts a processor 50 in accordance with the preferred embodiment of the present invention. As can be seen by referring to FIG. 3, the processor 50 includes a TAP 31, similar to the one implemented by processor 15 of FIG. 2. The TAP 31 is interfaced with a TAP interface 52. The TAP interface 52 is also interfaced with other components of the processor 50 via a local interface 55, which may include one or more buses. An input interface 58 allows data from external sources (e.g., peripheral devices) to be input into the processor 50, and an output interface 61 allows data to be externally output from the processor 50.

A clock 64 generates a clock signal, which is used, via conventional techniques, to control the timing of the signals communicated by the processor 50. The processor 50 also includes TDI data 67 and TMS data 69 stored in memory 72. The TDI data 67, similar to the data transmitted via the TDI signal to processor 15 of FIG. 2, includes data that is to be used by the TAP 31 to test the processor 50. Furthermore, the TMS data 69, similar to the data transmitted via the TMS signal to processor 15 of FIG. 2, includes control data that corresponds to the TDI data 67 and that indicates when the corresponding data in TDI data 67 defines an instruction so that the TAP 31 may properly execute the instructions defined by the TDI data 67. Therefore, the TMS data 69, similar to the TMS signal on connection 22 of FIG. 2, controls how the TAP 31 processes the TDI data 67.

The preferred embodiment also includes a test application 77 that may be implemented in software, hardware, or a combination thereof. As shown by FIG. 3, the test application 77 is implemented in software in the preferred embodiment and is stored in memory 72. When executed, the test application 77 is designed to interface test data with the TAP 31 so that the operation of the processor 50 may be tested.

In this regard, when the processor 50 is to be tested, the test application 77 transmits the TDI data 67 and the TMS data 69 from memory 72 to TAP interface 52 via local interface 55. The TDI data 67 and the TMS data 69 may be transmitted serially to TAP interface 52, but to increase performance, the TDI data 67 and the TMS data 69 are preferably transmitted in parallel to TAP interface 52 via parallel buses within local interface 55. Therefore, connections 74 and 75 (as well as connection 73) are preferably parallel connections.

Figure 4:
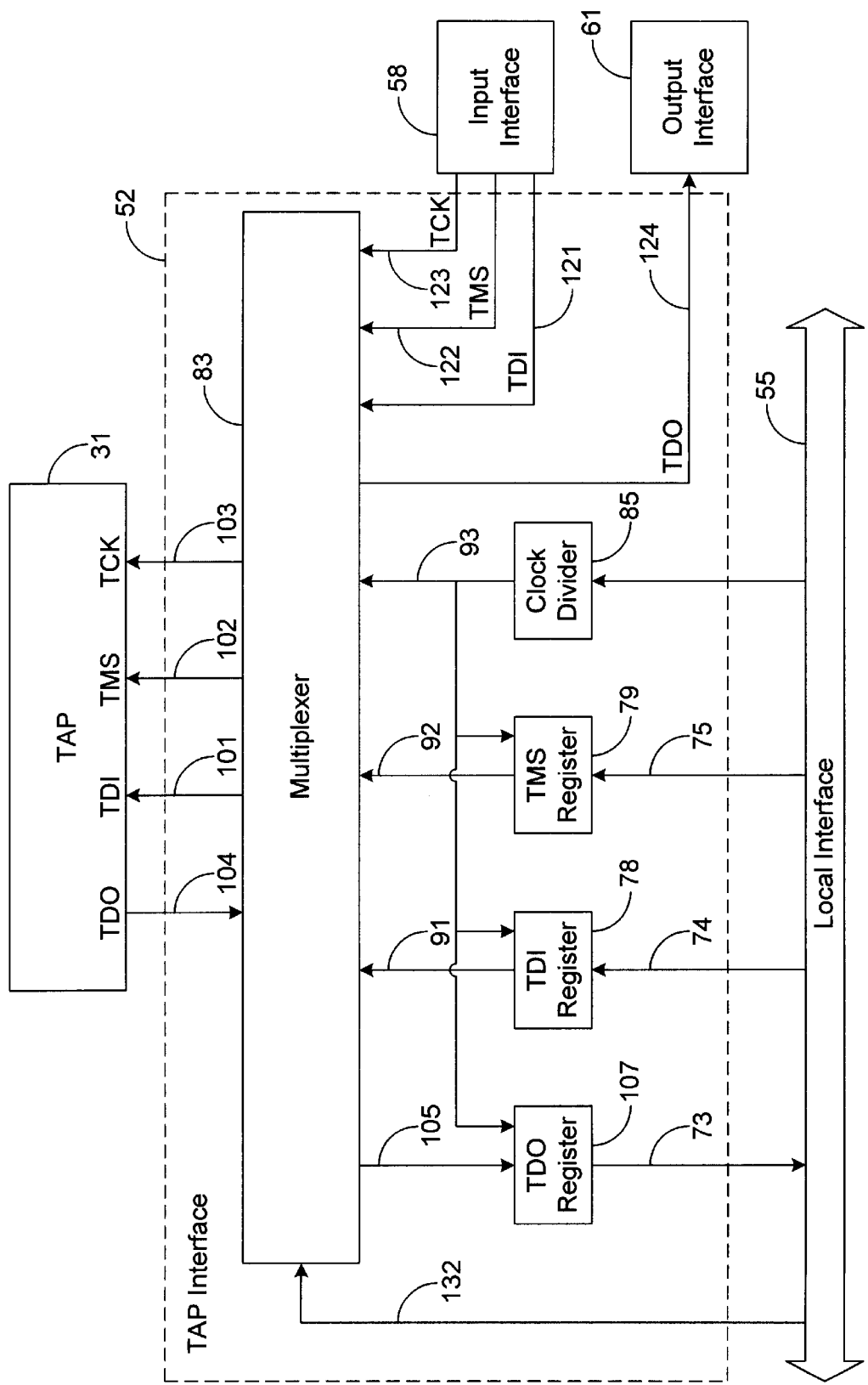
FIG. 4 is a block diagram illustrating a more detailed view of a test access port (TAP) interface depicted in FIG. 3.

As shown by FIG. 4, the TAP interface 52 includes a TDI register 78 and a TMS register 79 that respectively receive the TDI data 67 and the TMS data 69 from memory 72. The TDI register 78 and the TMS register 79 are preferably configured as shift registers and, therefore, serially shift the received data into a multiplexer 83 upon active edges of a test clock signal (TCK) transmitted from a clock divider 85.

In this regard, the clock divider 85 receives the clock signal generated by clock 64. Note that the data received by the TDI and TMS registers 78 and 79 are clocked into registers 78 and 79 via the clock signal generated by clock 64. The clock divider 85 is configured to transmit the data of the clock signal at the rate that data is to be processed (i.e., received) by TAP 31. This rate may be the same as the clock signal generated by the clock 64, or this rate may be slower than the clock signal generated by the clock 64. Conventional devices for producing clock signals at a fractional rate of a reference or master clock signal may be used to implement the functionality of the clock divider 85. To synchronize the data output by the TDI register 78 and the TMS register 79 with the TAP 31, the TCK signal output by clock divider 85 may be transmitted to the TDI register 78 and the TMS register 79 and used to clock out the TDI data 67 and the TMS data 69 from the TDI register 78 and the TMS register 79, respectively.

In a first mode of operation, the multiplexer 83 respectively receives the data transmitted from TDI register 78, TMS register 79, and clock divider 85 via connections 91–93, as depicted by FIG. 4. The multiplexer 83 then respectively transmits on connections 101–103 the signals received from connections 91–93. Therefore, the signals output by TDI register 78, TMS register 79, and clock divider 85 pass through multiplexer 83 and are received by the TAP 31, which processes these signals according to the techniques described hereinabove for the TAP 31 depicted by FIG. 2 and according to the techniques described by I.E.E.E. Standard 1149.1.

In processing the signals from the TDI register 78, the TMS register 79, and the clock divider 85, the TAP 31 produces state data, which indicates the state of the processor 50. This state data is serially transmitted from TAP 31 to multiplexer 83 via connection 104, and the multiplexer 83 transmits the state data via connection 105 to TDO register 107, which preferably converts the state data from serial into parallel form. Although other embodiments are possible, the state data is clocked into the TDO register 107 via the TCK signal transmitted from clock divider 85. The state data is transmitted from TDO register 107 to memory 72 or to an external device (not shown) on the active edges of the clock signal generated by clock 64. For optimization reasons, the state data is preferably transmitted in parallel form out of TDO register 107, but the state data may be transmitted from TDO register 107 in serial form, if desired.

If the state data is transmitted from TDO register 107 to an external device (i.e., a peripheral device), then the external device should be capable of storing and/or analyzing the state data. Note that the external device can be a relatively simple and inexpensive device (as compared with testing device 12), since the external device does not interface the TDI data 67 with the TAP 31.

When the state data is transmitted from TDO register 107 to memory 72 (FIG. 3), the state data is preferably stored in memory 72 as output data 111. At a later time, the output data 111 can be transmitted to an external device (not shown) for analysis. Alternatively, the test application 77 may be configured to analyze the output data 111 for errors.

Accordingly, in the first mode of operation, an external testing device 12 does not need to be used to input the TDI data 67 into the TAP 31. However, if desired, the preferred embodiment can be additionally designed to enable the TAP 31 to receive the TDI data 67 from an external testing device 12, if desired. In this regard, the multiplexer 83 is coupled to connections 121–123, which are also coupled to input interface 58, as shown by FIG. 4, and the multiplexer 83 is also coupled to output interface 61 via connection 124.

In a second mode of operation, testing device 12 is coupled to the input interface 58 and serially transmits the TDI, TMS, and TCK signals to connections 121–123, respectively. The multiplexer 83 receives these signals from the input interface 58 and respectively transmits the received TDI, TMS, and TCK signals across connections 101–103, respectively, to TAP 31. The TAP 31 receives and processes these signals as described hereinabove. While processing these signals, the TAP 31 captures state data and transmits the state data across connection 104 to multiplexer 83. The multiplexer 83 receives this state data and transmits this state data across connection 124 to output interface 61, which is also coupled to the external testing device 12. The external testing device 12 then stores and/or analyzes the state data via conventional techniques.

Consequently, in the first mode of operation, the multiplexer 83 is designed to transmit signals from connections 91–93, and 104 to connections 101–103 and 105, respectively, and to refrain from transmitting any signals received from connections 121–123. In the second mode of operation, the multiplexer 83 is designed to respectively transmit the signals received from connections 121–123 and 104 to connections 101–103 and 124, respectively, and to refrain from transmitting any signals received from connections 91–93. Therefore, in the first mode of operation, the TAP 31 processes data from the TDI data 67 and TMS data 69 stored in memory 72, and in the second mode of operation, the TAP 31 processes the data transmitted from testing device 12, instead.

To select between modes of operation, the processor 50 provides a control signal across connection 132. When the control signal on connection 132 is asserted, the multiplexer 83 operates as described hereinabove for the first mode of operation. When the control signal on connection 132 is deasserted, the multiplexer 83 operates as described hereinabove for the second mode of operation. Accordingly, the mode of operation can be controlled by controlling the signal on connection 132, and when transmitting the TDI data 67 and TMS data 69 to registers 78 and 79, the test application 77 is designed to control the signal on connection 132 so that the multiplexer 83 operates according to the first mode described hereinabove.

It should be noted that the present invention uses the clock signal produced by clock 64 or a clock signal derived from the signal produced by clock 64. However, it is possible to utilize clock signals from other sources. For example, an external clock signal or signals may be provided and utilized, if desired.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. A computer having a processor, said processor comprising: memory;

a first register coupled to said memory, said first register configured to receive test data from said memory and to serially transmit said test data;

a second register coupled to said memory, said second register configured to receive control data corresponding with said test data and to serially transmit said control data;

an interface configured to receive external signals;

a multiplexer coupled to said first and second registers and to said interface, said multiplexer configured to receive said test data transmitted by said first register and said control data transmitted by said second register, said multiplexer further configured to select said test data and said control data based on a control signal and to transmit said selected data; and a test access port configured to receive said selected data from said multiplexer, said test access port configured to utilize said selected data to capture state data defining at least one state of said processor, said test access port further configured to transmit said state data to said multiplexer.

2. The computer of claim 1, wherein said processor further comprises:

a clock configured to generate a clock signal; and a clock divider coupled to said multiplexer and configured to receive said clock signal and to modify a frequency of said clock signal, said clock divider further configured to transmit said clock signal to said multiplexer, wherein said multiplexer is further configured to select said clock signal based on said control signal and to transmit said clock signal to said test access port.

3. The computer of claim 1, wherein said multiplexer is further configured to select data from said interface when said control signal exhibits a particular state.

4. A processor, comprising:

memory having test data and control data stored therein;

a test access port configured to receive said test data and control data and to utilize said test data and said control data to capture state data defining at least one state of said processor; and a test application configured to transmit said test data and said control data from said memory to said test access port.

5. The processor of claim 4, further comprising:

a first register configured to receive said test data, to convert said test data into serial form, and to transmit said test data to said test access port; and a second register configured to receive said control data, to convert said control data into serial form, and to transmit said control data to said test access port.

6. The processor of claim 4, further comprising:

a multiplexer configured to receive said test data and said control data and to transmit said test data and said control data to said test access port; and an interface coupled to said multiplexer and configured to receive external signals and to transmit said external signals to said multiplexer, wherein said multiplexer selects said test data and said control data for transmission based on a control signal received by said multiplexer.

7. The processor of claim 6, wherein said test access port is further configured to transmit said state data to said multiplexer and said test application is further configured to analyze said state data to detect an error associated with said processor.

8. The processor of claim 6, further comprising:

a clock configured to generate a clock signal;

a clock divider configured to receive said clock signal and to modify a frequency of said clock signal, wherein said test access port is configured to receive said clock signal from said clock divider and to utilize said clock signal to receive said test data and said control data.

9. The processor of claim 6, wherein said test access port is further configured to transmit said state data to said multiplexer.

10. The processor of claim 6, further comprising:

a first register configured to receive said test data, to convert said test data into serial form, and to transmit said test data to said multiplexer; and a second register configured to receive said control data, to convert said control data into serial form, and to transmit said control data to said multiplexer.

11. A method for testing processors, comprising the steps of:

providing a processor having memory, a test access port, and a multiplexer, said test access port interfaced with said multiplexer;

storing test data and control data into said memory, said control data corresponding with said test data;

transmitting said test data and said control data from said memory to said multiplexer;

selecting said test data and said control data at said multiplexer;

transmitting said test data and said control data from said multiplexer to said test access port;

receiving said test data and said control data at said test access port;

utilizing said test data and said control data received by said test access port to capture state data defining at least one state of said processor; and analyzing said state data to identify errors associated with said processor.

12. The method of claim 11, further comprising the steps of:

receiving external signals;

selecting said external signals at said multiplexer;

transmitting said external signals to said test access port; and utilizing said external signals received by said test access port to capture state data defining at least one state of said processor.

13. The method of claim 11, further comprising the steps of:

generating a clock signal;

modifying a frequency of said clock signal; and utilizing said clock signal subsequent to said modifying step to perform said receiving step.

* * * * *